(12) United States Patent
Aomatsu

(10) Patent No.: US 10,280,278 B2
(45) Date of Patent: *May 7, 2019

(54) RUBBER COMPOSITION

(71) Applicant: BRIDGESTONE CORPORATION, Tokyo (JP)

(72) Inventor: Keiichi Aomatsu, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/893,348

(22) PCT Filed: May 22, 2014

(86) PCT No.: PCT/JP2014/063562
§ 371 (c)(1),
(2) Date: Nov. 23, 2015

(87) PCT Pub. No.: WO2014/189102
PCT Pub. Date: Nov. 27, 2014

(65) Prior Publication Data
US 2016/0130417 A1  May 12, 2016

(30) Foreign Application Priority Data
May 24, 2013 (JP) .................. 2013-109647

(51) Int. Cl.
| | | |
|---|---|---|
| C08K 3/04 | (2006.01) |
| C08L 9/06 | (2006.01) |
| C08L 7/00 | (2006.01) |
| B60C 1/00 | (2006.01) |
| C08L 15/00 | (2006.01) |
| C08K 3/36 | (2006.01) |
| C08K 5/548 | (2006.01) |

(52) U.S. Cl.
CPC .............. *C08K 3/04* (2013.01); *B60C 1/0016* (2013.01); *C08K 3/36* (2013.01); *C08K 5/548* (2013.01); *C08L 7/00* (2013.01); *C08L 9/06* (2013.01); *C08L 15/00* (2013.01); *C08K 2201/006* (2013.01); *Y02T 10/862* (2013.01)

(58) Field of Classification Search
CPC .............. C08K 3/04; C08L 9/06; C08L 7/00
USPC .......................................... 524/493
See application file for complete search history.

(56) References Cited

U.S. PATENT DOCUMENTS

| | | | |
|---|---|---|---|
| 6,197,870 B1 | 3/2001 | Sakakibara | |
| 7,585,913 B2 | 9/2009 | Nakayama et al. | |
| 9,873,778 B2* | 1/2018 | Saito ...................... | B60C 1/0016 |
| 2005/0096424 A1 | 5/2005 | Otsuji et al. | |
| 2006/0094815 A1* | 5/2006 | Kunisawa ................. | C08L 9/06 |
| | | | 524/496 |
| 2006/0199894 A1 | 9/2006 | Nakayama et al. | |
| 2007/0197715 A1* | 8/2007 | Yanagioka ............. | B60C 1/0016 |
| | | | 524/495 |
| 2011/0224364 A1 | 9/2011 | Yamagishi | |
| 2014/0371372 A1* | 12/2014 | Hirayama ............... | C08L 15/00 |
| | | | 524/493 |
| 2016/0053098 A1* | 2/2016 | Saito ..................... | B60C 1/0016 |
| | | | 524/526 |

FOREIGN PATENT DOCUMENTS

| | | |
|---|---|---|
| CN | 1795234 A | 6/2006 |
| EP | 0985713 A2 | 3/2000 |
| EP | 1258373 A2 | 11/2002 |
| EP | 2 348 068 A1 | 7/2011 |
| EP | 2733168 * | 5/2014 |
| EP | 2738225 A1 | 6/2014 |
| JP | 2000-080302 A | 3/2000 |
| JP | 2002-338750 A | 11/2002 |
| JP | 2003-55503 A | 2/2003 |
| JP | 2004-59803 A | 2/2004 |
| JP | 2005-15511 A | 1/2005 |
| JP | 2005-126604 A | 5/2005 |
| JP | 2005-139230 A | 6/2005 |
| JP | 2005-213353 A | 8/2005 |
| JP | 2005-272729 A | 10/2005 |
| JP | 2006-83210 A | 3/2006 |
| JP | 2006-160873 A | 6/2006 |
| JP | 2009-40904 A | 2/2009 |
| JP | 2011-116920 A | 6/2011 |
| JP | 2011-213913 A | 10/2011 |

(Continued)

OTHER PUBLICATIONS

Communication dated Apr. 25, 2016 from the European Patent Office in counterpart European application No. 14800305.6.
International Preliminary Report on Patentability with Written Opinion from the International Bureau dated Dec. 3, 2015 in counterpart International Application No. PCT/JP2014/063562.
International Search Report of PCT/JP2014/063562 dated Aug. 12, 2014.

(Continued)

*Primary Examiner* — Deve E Valdez
(74) *Attorney, Agent, or Firm* — Sughrue Mion, PLLC

(57) ABSTRACT

Provide is a rubber composition which is improved in rolling resistance and abrasion resistance at the same time without reducing a wet grip performance, and the rubber composition is prepared by compounding 100 parts by mass of a rubber component containing 30% by mass or more of polyisoprene with 2 to 200 parts by mass of carbon black having a hydrogen release rate of 0.2% by mass or more and/or a ratio of a nitrogen adsorption specific surface area $N_2SA$ and a cetyltrimethylammonium bromide adsorption specific surface area CTAB, $N_2SA/CTAB$, of 1.2 to 1.5 and a nitrogen adsorption specific surface area $N_2SA$ of 160 to 300 $m^2/g$.

5 Claims, 1 Drawing Sheet

(56) References Cited

FOREIGN PATENT DOCUMENTS

| JP | 2012-87173 A | | 5/2012 |
|----|----|----|----|
| JP | 2012-158661 A | | 8/2012 |
| WO | WO2013/125614 | * | 8/2013 |
| WO | WO2014/181776 | * | 11/2014 |
| WO | 2013/015368 A1 | | 2/2015 |

OTHER PUBLICATIONS

Communication dated Aug. 3, 2016 from the European Patent Office in counterpart application No. 14800305.6.

* cited by examiner

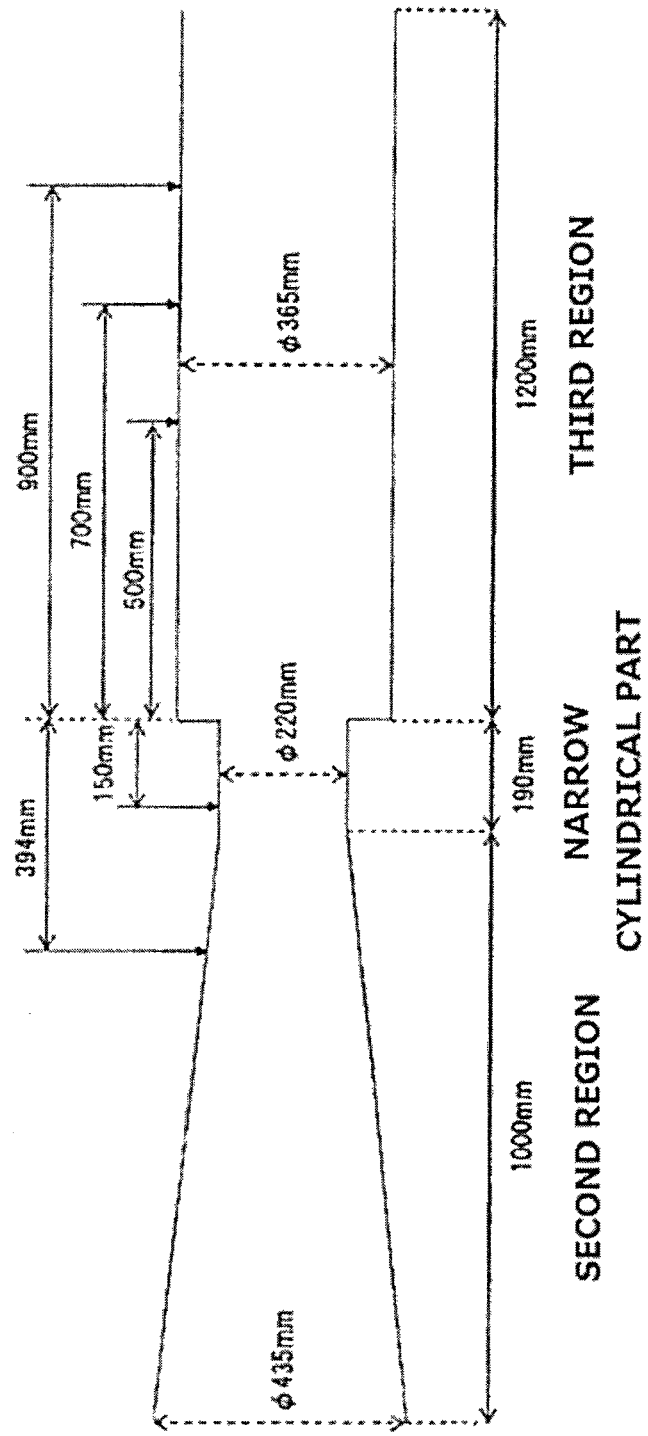

RUBBER COMPOSITION

CROSS REFERENCE TO RELATED APPLICATIONS

This application is a National Stage of International Application No. PCT/JP2014/063562 filed May 22, 2014 claiming priority based on Japanese Patent Application No. 2013-109647, filed May 24, 2013, the contents of which are incorporated herein by reference in their entirety.

TECHNICAL FIELD

The present invention relates to a rubber composition, specifically to a rubber composition which is improved in rolling resistance and an abrasion resistant performance at the same time without reducing a wet grip performance.

BACKGROUND ART

In accordance with an increased interest in safety of cars in recent years, requests for not only a low fuel consumption but also a steering stability have been increased. In order to meet the requests, tires highly satisfying low heat build-up achieved by reducing rolling resistance, a steering stability on wet road surfaces and dry road surfaces, and abrasion resistance in tire performances have been required. Also, in order to meet such requests as described above, reinforcing fillers and rubber components are tried to be improved.

Methods of (a) increasing an amount of a filler, (b) raising a grade of a filler (atomization, highly structuralizing), and (c) lowering a glass transition temperature Tg of a polymer used (increasing a use proportion of natural rubber NR and butadiene rubber BR) are usually carried out in order to improve the abrasion resistance. However, as for the performances of a tire are concerned, the rolling resistance is deteriorated or the abrasion resistance is improved at the sacrifice of the wet grip performance by the methods described above.

If a filler is increased in a blending amount or raised to a higher grade, not only the rolling resistance is deteriorated, but also the workability in refining the rubber gets worse, and they have to be improved. Accordingly, the oil amount is increased in many cases, but this method is followed by deterioration in the rolling resistance and reduction in the frictionality, and the targeted effect of improving the abrasion resistance is limited.

Carbon blacks are used as a filler for reinforcing. This is attributable to that carbon black can provide a rubber composition with high abrasion resistance. However, it is difficult to obtain by using singly carbon black a rubber composition in which a wet grip performance, abrasion resistance and a low fuel consumption are balanced at a high level, and silica is compounded instead of carbon black as an improving method therefor. However, it has been found that when silica is used as a filler, a blending amount of carbon black is relatively reduced, so that the rubber composition is inevitably reduced in fracture strength and abrasion resistance. Also, involved therein is the problem that silica has inferior dispersibility in rubber and that a rubber composition is increased in a Mooney viscosity in kneading and inferior in processability such as extrusion.

Rubber compositions for tire tread containing rubber components and inorganic compound powders in addition to carbon black and silica as fillers for the purpose of obtaining rubber compositions which are excellent in a low fuel consumption and a wet grip performance without lowering abrasion resistance are proposed in patent documents 1 to 3.

However, in the rubber compositions described in the patent documents 1 to 3, the inorganic compound powders have to be compounded in a relatively large amount in order to obtain a satisfactory effect of improving a wet grip performance and a fuel consumption. In the case, the abrasion resistance tends to be readily reduced, and therefore a rubber composition for tire which is further excellent in a balance between a wet grip performance, abrasion resistance and a low fuel consumption has not been obtained.

When a polymer having a low glass transition temperature is used, the abrasion resistance and the rolling resistance are improved at the same time, but on the other hand, the problem that the wet grip performance is reduced to a large extent is involved therein. A blending amount of silica is usually increased in order to solve the problem, and as a result, not only the rolling resistance but also refining and extruding works are deteriorated. If the blending amount is controlled to an optimum amount in a range in which the productivity is not damaged, the abrasion resistance and the rolling resistance are improved only to a small extent and stay unchanged from the existing ones.

Proposed in patent document 4 is a rubber composition for tire tread which is improved in a wet grip performance and abrasion resistance by using carbon black specifying a characteristic calculated from two-dimensional projection image analysis of aggregates and properties such as DBP and $N_2SA$ in addition to a diene base rubber component containing 70% by mass or more of a styrene-butadiene rubber having a glass transition temperature of −35° C. or higher, and silica. However, it does not sufficiently satisfy a low fuel consumption in addition to a wet grip performance and abrasion resistance.

Also, the present applicants filed previously a rubber composition for tire prepared by using novel carbon black used in the present invention in Japan (Patent Application 2013-097622).

PRIOR ART DOCUMENTS

Patent Documents

Patent document 1: Japanese Patent Application Laid-open 2002-338750
Patent document 2: Japanese Patent Application Laid-open 2003-55503
Patent document 3: Japanese Patent Application Laid-open 2005-213353
Patent document 4: Japanese Patent Application Laid-open 2012-158661

OUTLINE OF THE INVENTION

Problems to be Solved by the Invention

The present invention has been made in light of such existing situations as described above, and a purpose thereof is to provide a rubber composition which is improved in abrasion resistance and rolling resistance at the same time without reducing a wet grip performance.

Means for Solving the Problems

Intense studies repeated by the present inventors have resulted in finding that compounding a rubber component containing a suitable amount of a rubber having a low glass transition temperature (Tg) and a rubber having a high Tg with a specific amount of carbon black of a fine particle diameter having a high surface activity in a rubber composition for tire tread makes it possible to achieve the purpose of improving the abrasion resistance and the rolling resistance at the same time making the best use of the characteristics of both rubbers without reducing the wet grip performance, and thus the present has come to be completed.

That is, the present invention relates to a rubber composition prepared by compounding 100 parts by mass of a rubber component containing 30% by mass or more of polyisoprene as a polymer having a low Tg with 2 to 200 parts by mass of carbon black as a reinforcing filler, wherein the carbon black has a hydrogen release rate of 0.2% by mass or more and/or a ratio of a nitrogen adsorption specific surface area ($N_2SA$) and a cetyltrimethylammonium bromide adsorption specific surface area (CTAB), $N_2SA$/CTAB, of 1.2 to 1.5, and a nitrogen adsorption specific surface area ($N_2SA$) of 160 to 300 $m^2/g$.

Effects of the Invention

According to the present invention, obtained are a rubber composition for tire tread which is excellent in a wet grip performance and abrasion resistance and has small rolling resistance and a low fuel consumption.

BRIEF DESCRIPTION OF THE DRAWINGS

FIG. 1 is a drawing showing an outline of a production furnace for the carbon blacks used in the examples.

MODE FOR CARRYING OUT THE INVENTION

The embodiments of the present invention shall be explained below in detail.

The rubber composition of the present invention is prepared by compounding 100 parts by mass of a rubber component comprising a rubber having a high Tg and a rubber having a low Tg with 2 to 200 parts by mass of carbon black of a fine particle diameter having a high surface activity.

Polyisoprene can be used as the rubber having a low Tg used in the present invention, and natural rubber (NR) is particularly preferred. Polyisoprene to which natural rubber belongs has a Tg of about −70° C.

When the polyisoprene is used, a proportion of the polyisoprene in the rubber component is 30% by mass or more, preferably 60% by mass or less, and particularly the proportion of natural rubber is more preferably 30 to 40% by mass.

Further, a modified butadiene rubber in which a functional group having high reactivity with carbon black is introduced into an active site in a molecule of a butadiene rubber (BR) can be used as the rubber having a low Tg in the rubber component. The modified butadiene rubber is, for example, a butadiene rubber having a modified group containing at least one selected from a silicon atom, a tin atom, a sulfur atom, an oxygen atom and a titanium atom and/or a modified group containing a structure selected from primary amine, secondary amine, tertiary amine and cyclic amine in any of a polymerization active end, a polymerization initiation end and a polymerization chain. The modified BR described above has a Tg of about −80° C.

When the modified BR is used as the rubber component having a low Tg, a proportion of the modified BR in the rubber component is 15% by mass or more and 40% by mass or less, preferably 15 to 20% by mass or less.

On the other hand, the rubber component having a high Tg is effective for improving the abrasion resistance and the rolling resistance. Such rubber having a high Tg includes a styrene-butadiene rubber (SBR), and above all, SBR prepared by emulsion polymerization (e-SBR) can preferably be used. The e-SBR has a Tg of about −55° C. For example, commercially available JSR1723 and JSR0122 (manufactured by JSR Corporation) can be used as the e-SBR.

Further, a modified SBR is used as the rubber component having a high Tg in combination with the e-SBR.

SBR having amino group-containing alkoxysilane as a modified group can be used as the modified SBR.

The modified SBR has a Tg of about −20° C.

In the rubber composition of the present invention, a large amount of the rubber having a high Tg is used for the rubber component to form a main matrix, and a smaller amount of the rubber having a low Tg than that of the rubber having a high Tg is used in combination therewith, whereby carbon black can be localized in the rubber having a low Tg to lower the rolling resistance without reducing the wet grip performance. In the case, the rubber having a high Tg and the rubber having a low Tg stay in two or more phases to form a non-compatible system.

The rubber having a high Tg and the rubber having a low Tg form the non-compatible system, and when a relatively large amount of NR is compounded as the rubber having a low Tg to form a continuous structure of NR, the fracture resistance and the abrasion resistance are improved.

Further, when the modified BR is used as the rubber component having a low Tg, an amount of the modified BR is small as compared with that of NR, and a compatible system is formed with the rubber having a high Tg.

The rubber composition of the present invention can be improved in rolling resistance and abrasion resistance by compounding novel carbon black having specific characteristics. A blending amount of the carbon black is 2 to 200 parts by mass, preferably 5 to 100 parts by mass and more preferably 5 to 25 parts by mass based on 100 parts by mass of the rubber component. If a blending amount of the carbon black is less than 2 parts by mass, the abrasion resistance is deteriorated. Also, if a blending amount of the carbon black exceeds 200 parts by mass, a wet grip performance gets worse.

The carbon black used in the present invention is novel carbon black having the following characteristics:
1. a hydrogen release rate is 0.2% by mass or more, or
2. a ratio of specific surface areas $N_2SA$/CTAB is 1.2 to 1.5. Further preferably:
3. a nitrogen adsorption specific surface area ($N_2SA$) is 160 to 300 $m^2/g$,
4. a dibutyl phthalate (DBP) absorption amount is 100 to 150 ml/100 g,
5. an iodine adsorption specific surface area (IA) is 180 to 300 mg/g,
6. a tinting strength is 120 to 150, and
7. a light transmittance of toluene extract is 90 or more.

The hydrogen release rate described above is obtained by showing a generating amount of hydrogen in terms of a mass fraction, wherein carbon black dried for 1 hour in a constant temperature dryer of 105° C. for 1 hour is cooled down to room temperature in a desiccator and then put in a tin-made tubular sample vessel and pressed; it is tightly sealed and heated at 2000° C. for 15 minutes under an argon stream by means of a hydrogen analyzer to measure an amount of hydrogen gas generated and determine a mass fraction. The larger the amount of hydrogen generated is, the better the reactivity with the rubber is, and the more the abrasion resistance is enhanced. The nitrogen adsorption specific surface area ($N_2SA$) is measured according to JIS K6217-2.

The nitrogen adsorption specific surface area ($N_2SA$) is preferably 160 to 300 $m^2/g$, further preferably 180 to 240 $m^2/g$. If $N_2SA$ is less than 160 $m^2/g$, the abrasion resistance is deteriorated, and if it exceeds 300 $m^2/g$, the rolling resistance gets worse.

The CTAB adsorption specific surface area is measured according to JIS K6217-3.

The ratio of the specific surface areas $N_2SA$/CTAB is preferably 1.2 to 1.5. If the ratio of the specific surface areas $N_2SA$/CTAB is less than 1.2, the abrasion resistance is deteriorated, and if it is larger than 1.5, the rolling resistance gets worse.

The hydrogen release rate and the ratio of the nitrogen adsorption specific surface area ($N_2SA$) and the CTAB adsorption specific surface area (CTAB) $N_2SA$/CTAB, each described above, are indices representing a surface active characteristic of carbon black. These values of the carbon black used in the present invention fall in the ranges described above.

Further, the DBP absorption amount is measured according to JIS K6217-4 oil absorption amount A method.

The DBP absorption amount is 100 to 150 ml/100 g, preferably 110 to 140 ml/100 g. If the DBP absorption amount is less than 100 ml/100 g, the wet grip performance and the abrasion resistance are short. Further, molding processability of the rubber composition is reduced, and dispersibility of the carbon black is deteriorated, so that a reinforcing performance in the rubber composition is not sufficiently obtained. If the DBP absorption amount exceeds 150 ml/100 g, the viscosity is increased, and the processability gets worse.

The iodine adsorption specific surface area (IA) is measured according to JIS K6217-1.

The IA is 180 to 300 mg/g, preferably 200 to 270 mg/g.

Also, the tinting strength of the carbon black used in the present invention is measured by a phochtoron method described in JIS K6217-5, and it is 120 to 150, preferably 130 to 140.

The light transmittance of toluene extract is measured according to a method described in JIS K6218-4, and it is preferably 90 or more. If it is less than 90, the rolling resistance is likely to get worse.

The carbon black having the characteristics described above can be produced by controlling production conditions such as a raw material supply part, a raw material supply rate, a raw material supply temperature, a fuel oil supply rate, an air supply rate for fuel atomization, an air supply rate for burning, an air temperature for burning and a reaction termination part by means of an ordinary production apparatus for carbon black.

For example, the hydrogen release rate is controlled by adjusting the surface state of the carbon black by changing the reaction termination part and/or adjusting the air temperature for burning, and the DBP absorption amount is controlled by adjusting the growth degree of the carbon black aggregates by adjusting the raw material supply part and/or the potassium addition amount, and the like.

In the rubber composition of the present invention, a wet grip performance is improved by compounding silica. All commercially available products can be used as the silica. Among them, wet silica, dry silica and colloidal silica are preferably used, and the wet silica is particularly preferably used. The silica having a BET specific surface area (measured according to ISO 5794/1) of 50 to 300 $m^2/g$, preferably 100 to 230 $m^2/g$ is used. If a BET specific surface area of the silica is less than 50 $m^2/g$, the reinforcing property as a filler is unsatisfactory, and the abrasion resistance is reduced. Also, if a BET specific surface area of the silica exceeds 300 $m^2/g$, it becomes difficult to disperse well the silica, so that an effect of improving the wet grip performance is not sufficiently obtained.

Commercially available products such as a trade name "Nipsil AQ" (BET specific surface area=190 $m^2/g$) manufactured by Tosoh Silica Corporation, a trade name "Ultrtasil VN3" (BET specific surface area=175 $m^2/g$) manufactured by Degussa AG can be used as the silica described above. The silica may be used alone or in combination of two or more kinds thereof.

In the rubber composition used for tire according to the present invention, a blending amount of the silica is 20 to 130 parts by mass, preferably 40 to 90 parts by mass based on 100 parts by mass of the diene base rubber in order to satisfy the low heat build-up and the abrasion resistance. If a blending amount of the silica is less than 20 parts by mass, an effect of improving the wet grip performance is not sufficiently obtained. Also, if a blending amount of the silica exceeds 130 parts by mass, the abrasion resistance is reduced.

Also, dispersibility of the silica in the diene base rubber can be improved by compounding a silane coupling agent together with the silica, and therefore it is preferred. A blending amount of the silane coupling agent is preferably 3 to 15% by mass, more preferably 4 to 10% by mass based on a blending amount of the silica. If a blending amount of the silane coupling agent is less than 3% by mass, dispersibility of the silica cannot sufficiently be improved. Also, if a blending amount of the silane coupling agent exceeds 15% by mass, the silane coupling agents themselves are aggregated and condensed, and the desired effect cannot be obtained.

The kind of the silane coupling agent shall not specifically be restricted, and sulfur-containing silane coupling agents are preferred. Capable of being shown as the examples of the sulfur-containing silane coupling agents are, for example, bis(3-triethoxysilylpropyl) tetrasulfide, bis(3-triethoxysilylpropyl) disulfide, 3-trimethoxysilylpropylbenzothiazole tetrasulfide, γ-mercaptopropyltriethoxysilane, 3-octanoylthiopropyltriethoxysilane, and the like.

In the present invention, the rolling resistance and the abrasion resistance are improved by using both the silica and the carbon black. The total of the blending amounts of the silica and the carbon black is 20 to 230 parts by mass, preferably 40 to 130 parts by mass based on 100 parts by mass of the diene base rubber. If the total blending amount of the silica and the carbon black is less than 20 parts by mass, the abrasion resistance is not sufficiently enhanced. Also, if the total blending amount of the silica and the carbon black exceeds 230 parts by mass, the wet grip performance is deteriorated, and the rolling resistance gets worse.

The rubber composition of the present invention can be compounded with various additives usually used for rubber compositions for tire, such as vulcanizing agents or cross-linking agents, vulcanization accelerators, various inorganic fillers, various oils, antioxidants and plasticizers. The above additives can be kneaded to prepare rubber compositions by ordinary methods, and the rubber compositions can be used for vulcanization or cross-linking. The blending amounts of the additives can be conventional blending amounts as long as they do not go against the objects of the present invention.

The rubber composition of the present invention can be produced by mixing the respective components described above by means of an ordinary kneading machine, for example, a Banbury mixer, a kneader, a roll and the like.

A pneumatic tire produced by using the rubber composition according to the present invention can be improved in abrasion resistance and a low fuel consumption to a higher level than ever without reducing a wet grip performance, and it can suitably be used for a tread of a pneumatic tire for various vehicles.

EXAMPLES

The present invention shall be explained below in detail with reference to examples, but the present invention shall by no means be restricted to the following examples.

Production Examples 1 to 3

Production of Carbon Blacks CB1 to 3

A carbon black production furnace in which a first region (not illustrated): a fuel introducing part (an inside diameter: 680 mm, a length: 900 mm), a second region: a raw material introducing part (an upstream end inside diameter: 435 mm, a downstream end inside diameter: 220 mm, a length: 1000 mm, a taper angle: 6.1°), a narrow cylindrical part (an inside diameter: 220 mm, a length: 190 mm), and a third region: a reaction continuation and cooling chamber equipped with a quenching hydraulic spraying equipment for reaction termination (an inside diameter: 365 mm, a length: 1200 mm) were arranged from an upstream shown in FIG. 1 was used, and a heavy oil shown in Table 1 was used as a raw oil to produce carbon blacks of CB1 to 3 under operating conditions shown in Table 2.

TABLE 1

| Specific gravity (JIS K2249) (15/4° C.) | | 1.0833 |
|---|---|---|
| Kinetic viscosity (JIS K2283) (mm$^2$/s at 50° C.) | | 120.5 |
| Moisture (JIS K2275) (%) | | 0.1 |
| Residual carbon (JIS K2210) (%) | | 6.91 |
| Sulfur content (JIS K2213) (%) | | 0.94 |
| Carbon content (%) | | 90.4 |
| Hydrogen content (%) | | 7.6 |
| BMCI *1 | | 131 |
| Distillation characteristic (° C.) | I.B.P. *2 | 213 |
| | 10% fraction point | 310 |
| | 30% fraction point | 371 |
| | 50% fraction point | 381 |

*1 BMCI: Bureau of Mines Correlation Index (index of The United States Bureau of Mines)
*2 I.B.P.: Initial Boiling Point (first fraction point)

TABLE 2

| | CB1 | CB2 | CB3 |
|---|---|---|---|
| Air supply rate for burning (kg/hr) | 14000 | 14700 | 14500 |
| Air temperature for burning (° C.) | 767 | 702 | 711 |
| Fuel oil supply rate (kg/hr) | 755 | 785 | 785 |
| Raw material oil supply rate (kg/hr) | 3050 | 2000 | 2000 |
| Raw material oil pre-heating temperature (° C.) | 313 | 315 | 322 |
| Discharge pressure (MPa) | 2.75 | 1.84 | 2.08 |

TABLE 2-continued

| | CB1 | CB2 | CB3 |
|---|---|---|---|
| Potassium addition amount (ppm) | 1.0 | 0 | 0 |
| Raw material supply part (distance mm from downstream end to upstream side of narrow cylindrical part) | 150 | 394 | 394 |
| Reaction termination part (distance mm from downstream end of narrow cylindrical part to downstream side) | 700 | 700 | 500 |

Production Example 4

Production of Modified Styrene-Butadiene Rubber

An autoclave reactor of 5 liters which was dried and replaced with nitrogen was charged with cyclohexane 2500 g, tetrahydrofuran 25 g, styrene 100 g and 1,3-butadiene 390 g. The temperature of the reactor content was adjusted to 10° C., and then n-butyllithium (BuLi) 375 mg was added to start polymerization. The polymerization was carried out under adiabatic conditions, and the maximum temperature reached 85° C. When the polymerization conversion rate reached 99%, butadiene 10 g was added thereto, and they were polymerized for further 5 minutes. Then, silicon tetrachloride 100 mg was added thereto to carry out the reaction for 5 minutes, and subsequently N,N-bis(trimethylsilyl)aminopropylmethyldiethoxysilane 1020 mg was added thereto, and they were reacted for 15 minutes. After the reaction, 2,6-di-t-butyl-p-cresol (BHT) was added to the polymer solution to terminate the reaction. Next, the solvent was removed by steam stripping, and the resulting solid was dried by a hot roll controlled to 110° C. to obtain a copolymerized rubber. The copolymerized rubber thus obtained had a Tg of about −20° C.

Measuring the properties of the carbon blacks CB used in the examples and the comparative examples and evaluating the characteristics of the rubber compositions obtained were carried out by the following methods.

Measurement of CB:

1. Iodine Adsorption Specific Surface Area

Measured according to JIS K6217-1 and shown by an adsorption value mg/g of iodine per a unit mass of carbon black.

2. $N_2SA$ Adsorption Specific Surface Area

Measured according to JIS K6217-2 and shown by a specific surface area m$^2$/g per a unit mass of carbon black.

3. CTAB Adsorption Specific Surface Area

Measured according to JIS K6217-3 and shown by a specific surface area m$^2$/g per a unit mass of the carbon black.

4. DBP Absorption

Measured according to a JIS K6217-4 absorption A method and shown by a volume ml of dibutyl phthalate (DBP) absorbed per 100 g of carbon black.

5. Tinting strength

Measured by a photochron method described in JIS K6217-5.

6. Light transmittance of toluene extract

Measured according to a method described in JIS K6218-4 and shown by a percentage obtained by comparing it with that of purified toluene.

7. Hydrogen release rate

1) A carbon black sample is dried in a constant temperature dryer of 105° C. and cooled down to room temperature in a desiccator.

2. The sample 10 mg is precisely weighed into a tin-made tubular sample vessel, and it is pressed and tightly sealed.

3. It is heated at 2000° C. for 15 minutes under an argon stream by means of a hydrogen analyzer (EMGA621W manufactured by Horiba, Ltd.) to measure an amount of hydrogen gas generated and determine a mass fraction.

Abrasion Resistance:

A Lambourne type abrasion tester was used to measure an abrasion amount at a slipping rate of 25% and a measuring temperature of room temperature, and it was shown by an index, wherein the value of Comparative Example 1 or 2 was set to 100. It is shown that the larger the index value is, the better the abrasion resistance is.

Rolling Resistance (50° C., Tan δ):

A viscoelasticity measuring equipment (manufactured by Rheometric Corporation) was used to measure a loss tangent tan δ at a temperature of 50° C., a distortion of 1% and a frequency of 15 Hz. It was shown by an index, wherein the numerical value of the comparative example was set to 100. It is shown that the larger the numerical value is, the lower the rolling resistance is.

Wet Grip Performance (0° C., Tan δ):

A viscoelasticity measuring equipment (manufactured by Rheometric Corporation) was used to measure a loss tangent tan δ at a temperature of 0° C., a distortion of 1% and a frequency of 15 Hz. It was shown by an index, wherein the numerical value of the comparative example was set to 100. It is shown that the larger the numerical value is, the better the wet grip performance is.

The properties of the carbon blacks used in the examples and the comparative examples were measured by the measuring methods described above, and the results thereof are shown in Table 3.

TABLE 3

|  |  | CB1 | CB2 | CB3 |
|---|---|---|---|---|
| IA | mg/g | 142 | 252 | 247 |
| DPB absorption | ml/100 g | 125 | 127 | 135 |
| $N_2SA$ | $m^2/g$ | 147 | 225 | 219 |
| Tinting strength |  | 134 | 142 | 137 |
| Released hydrogen | % | 0.332 | 0.207 | 0.256 |
| $N_2SA/CTAB$ |  |  | 1.06 | 1.30 | 1.35 |
| Light transmittance of toluene extract |  | 86 | 100 | 100 |

Examples 1 to 2 and Comparative Example 1

Three kinds of carbon blacks shown in Table 3 were used, and mixtures using the modified SBR produced in Production Example 4, commercially available e-SBR and natural rubber as the rubber components according to recipes shown in Table 4 were kneaded by means of a Banbury mixer to prepare rubber compositions.

The respective rubber compositions thus obtained were evaluated by the evaluating methods described above. The results thereof are shown in Table 4.

TABLE 4

|  | Comparative Example | Example | |
|---|---|---|---|
|  | 1 | 1 | 2 |
| Recipe for composition (parts by mass) | | | |
| Modified SBR *1 | 57 | 57 | 57 |
| e-SBR *2 | 8 | 8 | 8 |
| Natural rubber *3 | 35 | 35 | 35 |
| CB1 *4 | 10 | | |
| CB2 *4 | | 10 | |
| CB3 *4 | | | 10 |
| Silica *5 | 50 | 50 | 50 |
| Silane coupling agent *6 | 4 | 4 | 4 |
| Zinc oxide | 2 | 2 | 2 |
| Stearic acid | 1.5 | 1.5 | 1.5 |
| Aroma oil | 8 | 8 | 8 |
| Antioxidant 6C *7 | 1 | 1 | 1 |
| Vulcanization accelerator D *8 | 1 | 1 | 1 |
| Vulcanization accelerator DM-P *9 | 1 | 1 | 1 |
| Vulcanization accelerator NS-P *10 | 1 | 1 | 1 |
| Sulfur | 1.5 | 1.5 | 1.5 |
| Physical properties (index) | | | |
| Wet grip performance | 100 | 100 | 100 |
| Rolling resistance | 100 | 98 | 99 |
| Abrasion resistance | 100 | 104 | 108 |

Examples 3 to 6 and Comparative Example 2

Carbon black CB3 shown in Table 3 was used, and mixtures using the modified SBR produced in Production Example 4, commercially available e-SBR and natural rubber as the rubber components according to recipes shown in Table 5 were kneaded by means of the Banbury mixer to prepare rubber compositions.

The respective rubber compositions thus obtained were evaluated by the evaluating methods described above. The results thereof are shown in Table 5.

TABLE 5

|  | Comparative Example | Example | | | |
|---|---|---|---|---|---|
|  | 2 | 3 | 4 | 5 | 6 |
| Recipe for composition (parts by mass) | | | | | |
| Modified SBR *1 | 52 | 52 | 52 | 52 | 65 |
| e-SBR *2 | 28 | 13 | 8 | 0 | 0 |
| Natural rubber *3 | 20 | 35 | 40 | 48 | 35 |
| CB1 *4 | | | | | |
| CB2 *4 | | | | | |
| CB3 *4 | 10 | 10 | 10 | 10 | 10 |
| Silica *5 | 50 | 50 | 50 | 50 | 50 |
| Silane coupling agent *6 | 4 | 4 | 4 | 4 | 4 |
| Zinc oxide | 2 | 2 | 2 | 2 | 2 |
| Stearic acid | 1.5 | 1.5 | 1.5 | 1.5 | 1.5 |
| Aroma oil | 8 | 8 | 8 | 8 | 8 |
| Antioxidant 6C *7 | 1 | 1 | 1 | 1 | 1 |
| Vulcanization accelerator D *8 | 1 | 1 | 1 | 1 | 1 |
| Vulcanization accelerator DM-P *9 | 1 | 1 | 1 | 1 | 1 |
| Vulcanization accelerator NS-P *10 | 1 | 1 | 1 | 1 | 1 |
| Sulfur | 1.5 | 1.5 | 1.5 | 1.5 | 1.5 |

TABLE 5-continued

| | Comparative Example | Example | | | |
|---|---|---|---|---|---|
| | 2 | 3 | 4 | 5 | 6 |
| Physical properties (index) | | | | | |
| Wet grip performance | 100 | 98 | 98 | 97 | 99 |
| Rolling resistance | 100 | 100 | 100 | 100 | 99 |
| Abrasion resistance | 100 | 110 | 109 | 115 | 110 |

Notes (Tables 4 to 5)
*1: Modified SBR styrene amount: 25%, vinyl amount of the diene compound part: 55% (produced in Production Example 4)
*2: e-SBR styrene amount: 40%, vinyl amount of the diene compound part: 19% (manufacture by JSR Corporation)
*3: Natural rubber TSR20
*4: described in Table 3
*5: Nipsil AQ (manufactured by Tosoh Silica Corporation)
*6: Si69 (bis(3-triethoxysilylpropyl) tetrasulfide, manufactured by Evonik Industries AG)
*7: NOCRAC 6C (N-(1,3-dimethylbutyl)-N'-phenyl-p-phenylenediamine, manufactured by Ouchi Shinko Industrial Co., Ltd.)
*8: NOCCELER D (diphenylguanidine, manufactured by Ouchi Shinko Industrial Co., Ltd.)
*9: NOCCELER DM-P (benzothiazyl disulfide, manufactured by Ouchi Shinko Industrial Co., Ltd.)
*10: NOCCELER NS-P (N-t-butyl-2-benzothiazylsulfenamide, manufactured by Ouchi Shinko Industrial Co., Ltd.)

As apparent from the results shown in Tables 4 to 5, it is found that the rubber compositions of the present invention prepared by using the carbon blacks having a hydrogen release rate which falls in the range prescribed in the present invention and using the same amount of the low Tg rubber as the rubber composition prepared by using carbon black having a hydrogen release rate which falls outside the range prescribed in the present invention, and the rubber compositions of the present invention prepared by using the carbon blacks and polyisoprene prescribed in the present invention in the amounts falling in the ranges prescribed in the present invention as compared with the rubber compositions prepared by using those falling outside the range prescribed in the present invention maintain a wet grip performance without almost reducing it and are improved in abrasion resistance.

INDUSTRIAL APPLICABILITY

The rubber compositions of the present invention can be used for tire treads of various cars.

What is claimed is:

1. A rubber composition prepared by compounding 100 parts by mass of a rubber component containing 30% by mass or more of polyisoprene with 2 to 200 parts by mass of carbon black having the following characteristics:
   (1) a hydrogen release rate of 0.2% to less than 0.3% by mass,
   (2) a ratio $N_2SA/CTAB$ of 1.2 to 1.5 in which $N_2SA$ is a nitrogen adsorption specific surface area and CTAB is a cetyltrimethylammonium bromide adsorption specific surface area,
   (3) a nitrogen adsorption specific surface area $N_2SA$ of 180 to 300 $m^2/g$,
   (4) an iodine adsorption specific surface area IA of 180 to 300 mg/g,
   (5) a dibutyl phthalate (DBP) absorption amount of 100 to 150 ml/100 g,
   (6) a tinting strength of 120 to 150, and
   (7) a light transmittance of toluene extract of 90 or more.

2. The rubber composition as described in claim 1, wherein the polyisoprene in the rubber component is natural rubber.

3. The rubber composition as described in claim 1, wherein a styrene-butadiene rubber other than the polyisoprene is contained as the rubber component.

4. The rubber composition as described in claim 1, wherein a content of the polyisoprene in the rubber component is 60% by mass or less.

5. The rubber composition as described in claim 1, wherein a blending amount of the carbon black is 5 to 25 parts by mass based on 100 parts by mass of the rubber component.

* * * * *